(12) United States Patent
Koefinger et al.

(10) Patent No.: US 8,474,758 B2
(45) Date of Patent: Jul. 2, 2013

(54) AIRCRAFT COMPONENT ASSEMBLY SYSTEM

(75) Inventors: Christian Koefinger, Kufstein (AT); Joachim Metzger, Oepfingen (DE); Michael Auburger, Erlenmoos (DE)

(73) Assignee: Airbus Operations GmbH, Hamburg (DE)

( * ) Notice: Subject to any disclaimer, the term of this patent is extended or adjusted under 35 U.S.C. 154(b) by 293 days.

(21) Appl. No.: 12/739,023

(22) PCT Filed: Oct. 22, 2008

(86) PCT No.: PCT/EP2008/008923
§ 371 (c)(1),
(2), (4) Date: Sep. 13, 2010

(87) PCT Pub. No.: WO2009/053040
PCT Pub. Date: Apr. 30, 2009

(65) Prior Publication Data
US 2011/0024565 A1    Feb. 3, 2011

Related U.S. Application Data

(60) Provisional application No. 60/981,536, filed on Oct. 22, 2007.

(30) Foreign Application Priority Data

Oct. 22, 2007    (DE) .......................... 10 2007 050 422

(51) Int. Cl.
*B64C 1/00* (2006.01)
*E04B 1/32* (2006.01)
(52) U.S. Cl.
USPC .......... 244/120; 244/119; 244/117 R; 52/639; 52/643; 52/644

(58) Field of Classification Search
USPC ..... 244/117 R, 120, 118.1, 131, 119; 52/247, 52/644, 643, 639, 480; 29/469, 897.2
See application file for complete search history.

(56) References Cited

U.S. PATENT DOCUMENTS 2,270,161 A * 1/1942 Briggs .......................... 52/93.2
3,142,461 A    7/1964 Naylor
(Continued)

FOREIGN PATENT DOCUMENTS

CN    1861477    11/2006
DE    102006034862    1/2008
(Continued)

OTHER PUBLICATIONS

International Search Report, PCT/ISA/220, PCT/ISA/210, PCT/ISA/237, Feb. 23, 2009.

(Continued)

*Primary Examiner* — Joseph W Sanderson
*Assistant Examiner* — Marc Burgess
(74) *Attorney, Agent, or Firm* — Wood, Herron & Evans, LLP

(57) ABSTRACT

An aircraft component assembly system for the assembly of an interior component, a pipe or an electric line in an aircraft includes at least one arc-shaped frame element, a connection element that extends between a first and a second end of the frame element, and a fastening apparatus for fastening the interior component, the pipe or the electric line to the frame element or the connection element. The system also includes a first guide device that is provided on the frame element or the connection element and is devised to interact with a second guide device, which is complementary to the first guide device and provided on an aircraft structure, in such a way that the aircraft component assembly system is connectable to the aircraft structure in a manner displaceable relative to the aircraft structure.

16 Claims, 8 Drawing Sheets

U.S. PATENT DOCUMENTS

| | | | |
|---|---|---|---|
| 4,799,631 A * | 1/1989 | Humphries et al. | 244/118.5 |
| 4,894,964 A * | 1/1990 | Thrift et al. | 52/93.1 |
| 5,108,048 A * | 4/1992 | Chang | 244/118.1 |
| 5,816,534 A | 10/1998 | Schumacher | |
| 5,876,024 A * | 3/1999 | Hain | 244/119 |
| 6,134,854 A * | 10/2000 | Stanchfield | 52/480 |
| 6,219,983 B1 * | 4/2001 | Gråkjaar Jensen et al. | 244/118.6 |
| 6,679,009 B2 * | 1/2004 | Hotes | 52/86 |
| 7,059,565 B2 * | 6/2006 | Scown et al. | 244/119 |
| 7,232,095 B2 * | 6/2007 | Park et al. | 244/118.6 |
| 8,262,023 B2 * | 9/2012 | Kofinger et al. | 244/119 |
| 2003/0042363 A1* | 3/2003 | Dussac et al. | 244/119 |
| 2005/0044712 A1* | 3/2005 | Gideon et al. | 29/897.32 |
| 2005/0236523 A1* | 10/2005 | Schwartz et al. | 244/119 |
| 2007/0007392 A1* | 1/2007 | Huber et al. | 244/137.1 |
| 2009/0250554 A1* | 10/2009 | Graeber et al. | 244/120 |
| 2012/0119028 A1* | 5/2012 | Griess et al. | 244/118.5 |
| 2012/0298799 A1* | 11/2012 | Grosse-Plankermann et al. | 244/119 |

FOREIGN PATENT DOCUMENTS

| | | |
|---|---|---|
| DE | 102006039290 | 3/2008 |
| DE | 102006039292 | 3/2008 |
| EP | 1510454 | 3/2005 |
| EP | 1717142 | 11/2006 |
| EP | 1803645 | 7/2007 |
| WO | 2006/136804 | 12/2006 |
| WO | 2008/043557 | 4/2008 |

OTHER PUBLICATIONS

Chinese Patent Office; Chinese Office Action; May 15, 2012 (3 pgs.); English language Translation of Chinese Office Action Summary (1 pg.).

* cited by examiner

AIRCRAFT COMPONENT ASSEMBLY SYSTEM

This application claims priority to PCT/EP2008/008923 filed Oct. 22, 2008, which claims priority to German Application No. 10 2007 050 422.7 and U.S. Application No. 60/981,536, both filed Oct. 22, 2007.

TECHNICAL FIELD

The invention relates to an aircraft component assembly system for use in the assembly of an interior component, a pipe and/or an electric line in an aircraft as well as to a method of assembling an interior component, a pipes and/or an electric line in an aircraft.

BACKGROUND

At present, when assembling interior components in an aircraft it is customary for the various components, such as for example dado panels, side trims, ceiling trims, rows of luminaires, luggage compartments and the like, to be connected individually to the aircraft structure. As each component has to be separately positioned and fastened to the aircraft structure, assembly of the interior components is often very time-consuming. Furthermore, changes of position of individual interior components or design changes to the interior components may be realized often only with difficulty because such changes as a rule entail an adaptation of an aircraft-structure-side holder and/or at least an adaptation of the fastening points provided on the aircraft structure for assembly of the interior components.

In a similar manner, pipes that are used for example as air-conducting lines of an aircraft air-conditioning system or for the water supply in an aircraft cabin as well as electric lines are currently also fastened individually in a time-consuming manner to the aircraft structure. After assembly, in the course of a final inspection the proper functioning of all of the lines has to be checked. In particular all of the pipes have to be checked for leaks, while in the case of the electric lines all of the interfaces have to be checked. In the case of the pipes and the electric lines too, changes of position or design changes may be realized only with difficulty as such changes likewise entail an adaptation of an aircraft-structure-side holder and/or at least an adaptation of the fastening points provided on the aircraft structure for assembly of the pipes and the electric lines. Changes of the fastening points for the pipes and/or the electric lines on the aircraft structure may moreover entail changes of the fastening points for the interior components on the aircraft structure and vice versa.

A self-supporting structure arrangement for the assembly of interior components in an aircraft is known from WO 2008/043557 A1, which was not published before the priority date of the present application.

The object underlying the invention is to provide an aircraft component assembly system for use in the assembly of an interior component, a pipe and/or an electric line in an aircraft as well as a method of assembling an interior component, a pipe and/or an electric line in an aircraft, which system and method enable easy and rapid assembly of the interior component, the pipe and/or the electric line in the aircraft as well as a simplified final inspection of these structural elements.

SUMMARY OF THE INVENTION

In order to achieve this object, an aircraft component assembly system according to the invention for use in the assembly of an interior component, a pipe and/or an electric line in an aircraft comprises at least one arc-shaped frame element. The frame element may be of a single- or multi-part construction. For example the frame element may at least in sections comprise longitudinal struts, which are disposed substantially parallel to one another and extend, in the assembled state of the frame element in an aircraft, substantially parallel to ribs of an aircraft structure. The longitudinal struts therefore preferably have a curvature that is adapted substantially to a curvature of the ribs of the aircraft structure. The length of the longitudinal struts is preferably selected in such a way that the frame element, in the assembled state in an aircraft, spans both side walls of an aircraft cabin as well as the aircraft cabin ceiling. If the frame element is of a multi-part construction, individual portions of the frame element may extend in over corresponding portions of the side walls and/or the ceiling of the aircraft cabin. Furthermore, the frame element may comprise an appropriate number of connecting struts extending at least in sections between the longitudinal struts to guarantee an adequate rigidity of the frame element. The frame element is made preferentially from a light and rigid material, such as for example aluminium, an aluminium alloy, Glass-Fiber Reinforced Polymer ("GFRP"), Carbon-Fiber Reinforced Polymer ("CFRP") or some other carbon fibre material. The aircraft component assembly system according to the invention may comprise only one arc-shaped frame element having a plurality of longitudinal struts that are disposed at least in sections substantially parallel to one another. Alternatively, however, the aircraft component assembly system according to the invention may comprise a plurality of frame elements that are formed separately from one another.

The aircraft component assembly system according to the invention moreover comprises a connection element, which extends between a first and a second end of the frame element and may be preassembled with the frame element to form a self-supporting assembly group that may be handled independently. The connection element guarantees an adequate static and dynamic stability of the aircraft component assembly system according to the invention and is preferably likewise made of a light and rigid material, such as for example aluminium, an aluminium alloy, GFRP, CFRP or some other carbon fibre material. The connection element preferably takes the form of a continuous sub-floor that is spanned in an arc-shaped manner by the frame element. In the assembled state of the aircraft component assembly system according to the invention in an aircraft, the connection element is preferably supported by crossmembers of the aircraft structure and forms or carries a floor of the aircraft cabin. By virtue of such a construction of the aircraft component assembly system according to the invention the number of crossmembers in the aircraft structure may optionally be reduced because only two crossmembers are needed to provide an adequate support of the connection element and hence of the entire aircraft component assembly system.

The aircraft component assembly system according to the invention further comprises a fastening apparatus for fastening the interior component, the pipe and/or the electric line to the frame element and/or the connection element. As a fastening apparatus for fastening the interior component, the pipe and/or the electric line to the frame element and/or the connection element a screw-fastening apparatus, a clamp, a rail or a detent apparatus may be used. The fastening apparatus may be fitted on the frame element and/or the connection element but may also be designed so as to be integrated with the frame element and/or the connection element.

With the aid of the fastening apparatus a dado panel, a side trim panel, a ceiling trim panel, a row of luminaires, a luggage compartment, a seat or some other interior component may be fastened to the frame element and/or the connection element. A pipe that may be fastened with the aid of the fastening apparatus to the frame element and/or the connection element may be for example an air-conducting line of an aircraft air-conditioning system or a water pipe. The fastening apparatus may fasten the pipe to the frame element and/or the connection element. Alternatively, however, the fastening apparatus may enable an integration of the pipe into the frame element and/or the connection element. If the fastening apparatus is to be used to fasten an electric line to the frame element and/or the connection element of the aircraft component assembly system according to the invention, the fastening apparatus may, if need be, be designed such that it may fasten a single electric line but also a bundle of electric lines to the frame element and/or the connection element of the aircraft component assembly system.

The fastening apparatus may be so designed that with its aid only a single component may be fastened to the frame element and/or the connection element of the aircraft component assembly system. Alternatively, however, the fastening apparatus may be so designed that a plurality of interior components, pipes and/or electric lines may be fastened with the aid of a single fastening apparatus to the frame element and/or the connection element of the aircraft component assembly system according to the invention. The aircraft component assembly system according to the invention may moreover also comprise a plurality of fastening apparatuses for fastening interior components, pipes and/or electric lines to the frame element and/or the connection element.

On the frame element and/or the connection element of the aircraft component assembly system according to the invention a first guide device is provided, which is devised to interact with a second guide device, which is complementary to the first guide device and is provided on an aircraft structure, in such a way that the aircraft component assembly system is connectable to the aircraft structure in a manner displaceable relative to the aircraft structure. With the aid of the first and the second guide device the aircraft component assembly system according to the invention, optionally with interior components, pipes and/or electric lines already fastened thereto, may be pushed into a desired position relative to the aircraft structure. The aircraft component assembly system according to the invention may therefore be fitted particularly easily and conveniently on the aircraft structure.

A particular advantage of the aircraft component assembly system according to the invention is that it may be used as a carrier element for various interior components, i.e. interior components of varying shape and size, pipes and/or electric lines. As a result, the number and the arrangement of the fastening points provided for these components on the aircraft structure need no longer be adapted to the individual components but merely to the aircraft component assembly system carrying the components. The aircraft component assembly system according to the invention therefore enables a decoupling of the fastening points provided on the interior components, pipes and/or electric lines from the fastening points provided on the aircraft structure. It is consequently possible to reduce considerably the number of fastening points provided on the aircraft structure for the interior components, pipes and/or electric lines through the use of the aircraft component assembly system according to the invention. A standardization of the arrangement of the fastening points for the interior components, pipes and/or electric lines on the aircraft structure is moreover possible.

Since the use of the aircraft component assembly system according to the invention makes it possible to dispense with a tuning of the interior-component-side and aircraft-structure-side fastening points, a greater flexibility in the design of both the interior components, pipes and/or electric lines and the aircraft structure is achieved. This greater flexibility may be utilized to optimize the weight of the interior components, pipes and/or electric lines and of the aircraft structure.

A further advantage achieved by the decoupling of the interior components, pipes and/or electric lines from the aircraft structure is that deformations of the aircraft structure that occur in flight are no longer transmitted directly to the interior components, pipes and/or electric lines. Consequently, relative movements between the interior components, the pipes and/or the electric lines may be minimized. Tolerance gaps between the individual components that are complicated to seal are therefore required only to a reduced extent.

Finally, the aircraft component assembly system according to the invention simplifies the final inspection of the interior components, pipes and/or electric lines as these components after fastening to the aircraft component assembly system according to the invention may be inspected while still outside of the aircraft. This enables faster and more convenient error analysis and error correction.

The aircraft component assembly system according to the invention preferably comprises a fixing device, which is devised to fix the aircraft component assembly system in a desired position on the aircraft structure. The aircraft component assembly system may then, by virtue of the interaction of the first guide device provided on the frame element and/or the connection element with the second guide device that is complementary to the first guide device and provided on the aircraft structure, be pushed into the desired position relative to the aircraft structure and fixed there. The fixing device may be for example a screw-fastening device that enables the aircraft component assembly system to be screw-fastened in the desired position to the aircraft structure.

The fixing device however preferably takes the form of a detent mechanism, which is devised to interlock the aircraft component assembly system with the aircraft structure when the aircraft component assembly system is situated in the desired position relative to the aircraft structure. A fixing device in the form of a detent mechanism enables a particularly convenient fastening of the aircraft component assembly system according to the invention to the aircraft structure. The fixing device may be provided for fixing the connection element to crossmembers of the aircraft structure.

As an alternative or in addition thereto, however, on the frame element at least one force introduction apparatus may also be formed for fitting the frame element on a rib of the aircraft structure. The force introduction apparatus may be for example of a shackle-shaped construction. For example there may be provided on each longitudinal strut of the frame element at least one force introduction apparatus, through which a screw or a bolt may be passed in order to connect the frame element easily and securely to a frame of the aircraft structure. If need be, it is however also possible to arrange a plurality of force introduction apparatuses distributed along the length of the longitudinal struts of the frame element in order to guarantee a secure fastening of the frame element to the aircraft structure.

In a preferred form of construction of the aircraft component assembly system according to the invention the first guide device comprises a guide rail extending from the connection element. This guide rail is preferably devised to interact with a receiver of the second guide device that is provided in crossmembers of the aircraft structure. Alternatively, the first guide device may comprise a receiver, which is formed in the connection element and devised to interact with a guide rail that extends from crossmembers of the aircraft structure. The aircraft component assembly system according to the invention may then be pushed, supported by the crossmembers of the aircraft structure, into the desired position relative to the aircraft structure and fastened there with the aid of the fixing device to the aircraft structure. This enables a particularly convenient assembly of the aircraft component assembly system according to the invention in an aircraft.

The first and/or the second guide device preferably comprise(s) a device for the acoustic decoupling of the aircraft component assembly system from the aircraft structure. As an alternative or in addition thereto, each mounting apparatus, via which the aircraft component assembly system rests on the aircraft structure, and/or each fixing device and/or force introduction apparatus, by which the aircraft component assembly system may be fastened to the aircraft structure, may be equipped with a device for the acoustic decoupling of the aircraft component assembly system from the aircraft structure.

As devices for the acoustic decoupling of the aircraft component assembly system from the aircraft structure shock mounts may be used. Here, by shock mounts are meant bearing arrangements that are made of a vibration-damping, for example a rubber-elastic material and ensure a shock-free fastening of the aircraft component assembly system, and hence of the interior components, pipes and/or electric lines fitted on the aircraft component assembly system, to the aircraft structure. Where necessary, in the shock mounts suitable through-openings may be provided, which enable a screw or a bolt for fastening the aircraft component assembly system to the aircraft structure to be passed through the shock mounts. Alternatively, flexible bushes may be provided in the shock mounts.

Preferably, on the aircraft component assembly system according to the invention at least one first interface is provided, which is connected to at least one electric line that is fastened to the aircraft component assembly system. The first interface is preferably electrically connectable to a second interface, which is complementary to the first interface but not fitted on the aircraft component assembly system, when the aircraft component assembly system is situated in the desired position relative to the aircraft structure. The second interface may be for example fastened to the aircraft structure or integrated into the aircraft structure. Alternatively, however, the second interface may be formed on a separate component. By a connection of the first interface to the second interface an electrical connection is rapidly and conveniently established between an electric line fastened to the aircraft component assembly system and a corresponding electric service cable.

Preferably a plurality of electric lines fastened to the aircraft component assembly system are connected to the first interface and may be connected electrically to corresponding service lines by a connection of the first interface to the second interface. If need be, on the aircraft component assembly system according to the invention a plurality of first interfaces may also be provided, which are connectable to corresponding complementary second interfaces when the aircraft component assembly system is situated in the desired position relative to the aircraft structure.

The electrical connection between the first and the second interface is preferably established when the aircraft component assembly system is fixed with the aid of the fixing device in the desired position on the aircraft structure. For example, the fixing device may comprise a lever, which is connectable by a pivot joint to a crossmember of the aircraft structure. At one end of the lever a detent apparatus may be situated, which is devised to interact with a complementary detent apparatus that is provided for example on the connection element of the aircraft component assembly system. The first interface may be integrated into the detent apparatus provided on the aircraft component assembly system, while the second interface may be integrated into the detent apparatus provided on the lever.

The lever may be for example preloaded by means of a spring into its interlock-deactivating position. When the aircraft component assembly system according to the invention is pushed into the desired position relative to the aircraft structure, a free end of the lever that is provided with a sliding face preferably interacts in such a way with the aircraft component assembly system that the lever is rotated into its interlock position, in which the detent apparatus provided on the lever latches with the complementary detent apparatus provided for example on the connection element of the aircraft component assembly system. As a result, the aircraft component assembly system is fixed in the desired position on the aircraft structure. At the same time an electrical connection is established between the first and the second interface. Such a design of the aircraft component assembly system according to the invention enables not only a rapid fixing of the aircraft component assembly system to the aircraft structure but also a rapid and easy establishing of an electrical connection between the electric lines fastened to the aircraft component assembly system and corresponding aircraft-structure-side service lines. What is more, the electric lines fastened to the aircraft component assembly system may be inspected for their proper functioning as far as the first interface while still outside of the aircraft.

A first connector of a pipe, which is fastened to the aircraft component assembly system and/or integrated into the aircraft component assembly system, is preferably connectable to a second connector that is complementary to the first connector when the aircraft component assembly system is situated in the desired position relative to the aircraft structure. The second connector may be for example fastened to the aircraft structure or integrated into the aircraft structure. Alternatively, however, the second connector may be formed on a separate component.

The connection between the first and the second connector, in a similar manner to the connection between the first and the second interface, is preferably established when the aircraft component assembly system according to the invention is fixed, with the aid of the fixing device, in the desired position on the aircraft structure. For example the second connector, like the second interface, may be integrated into a lever that also carries a detent apparatus of the fixing device for fixing the aircraft component assembly system to the aircraft structure. Alternatively it is however also conceivable to form the second connector on a separate lever, which automatically establishes a connection between the first and the second connector when the aircraft component assembly system according to the invention is situated in the desired position relative to the aircraft structure. This is meaningful particularly if the aircraft component assembly system carries a plurality of pipes having first connectors, which are to be connected to corresponding second connectors when the aircraft component assembly system is situated in the desired position relative to the aircraft structure.

If all of the electric lines fastened to the aircraft component assembly system according to the invention as well as all of the pipes fastened to the aircraft component assembly system according to the invention and/or integrated into the aircraft component assembly system are connectable directly to corresponding service lines when the aircraft component assembly system is situated in the desired position relative to the aircraft structure, the installation of the aircraft component assembly system as well as the start-up of the components fastened thereto is particularly simple and convenient (plug and play). Furthermore, the pipes, like the electric lines, may be tested up to the respective first interfaces and/or first connectors while still outside of the aircraft. This considerably simplifies the functional testing of these lines as well as the detection and correction of any errors.

At least one strut, for example a longitudinal strut of the frame element of the aircraft component assembly system according to the invention is preferably of a hollow-cylindrical construction. A hollow-cylindrical strut of the frame element may be used as an air- or water-conducting pipe that is integrated into the frame element and hence into the aircraft component assembly system according to the invention. What is more, a hollow-cylindrical strut of the frame element may also be used as a conduit for electric lines that are to be fastened to the frame element and hence to the aircraft component assembly system.

At present, insulation packages forming the secondary insulation of an aircraft are conventionally glued onto the interior components before the interior components are fastened to the aircraft structure. Often a plurality of differently shaped insulation packages are needed to copy the contour of the interior components, which is often curved and provided with shoulders and the like. Installing the secondary insulation is therefore time-consuming and cost-intensive.

According to a preferred form of construction of the invention the aircraft component assembly system therefore further comprises a further fastening device for fastening an insulation package to the frame element or the connection element. In other words, the aircraft component assembly system is so designed that at least one insulation package forming for example part of the aircraft secondary insulation may also be fastened to the aircraft component assembly system. For example, an interior component fastened to the frame element of the aircraft component assembly system may in the assembled state of the aircraft component assembly system be disposed at a side of the frame element remote from the aircraft structure. The insulation package may, on the other hand, in the assembled state of the aircraft component assembly system be disposed either at a side of the frame element facing the aircraft structure or be fastened between the interior component and the frame element at the side of the frame element remote from the aircraft structure.

Through the use of the aircraft component assembly system according to the invention to assemble insulation packages forming for example the secondary insulation of the aircraft it is possible to dispense with the laborious glueing of the insulation packages onto the interior components. In particular, the frame element of the aircraft component assembly system compared to most aircraft interior components has a much simpler contour without shoulders and the like, with the result that fewer separately formed insulation packages have to be used. Considerable cost savings are therefore possible.

The further fastening device for fastening an insulation package to the frame element or the connection element of the aircraft component assembly system according to the invention is preferably devised to fasten the insulation package in a mechanically detachable manner to the frame element or the connection element of the aircraft component assembly system. For example, the further fastening device may take the form of a Velcro fastener, a burr-and-fleece strip, a mushroom-button strip or a christmastree fastening device. Alternatively, it is possible to fasten the insulation package to the frame element with the aid of screws, rivets, clips, damping devices, magnetic holders, press fasteners with springs, an expansion fastening device or a spherical fastening device. It is further conceivable to suspend the insulation package from fastening points that are provided on the frame element or the connection element, or to make the insulation package slightly larger than the frame element or the connection element, fold it round the frame element or the connection element and enable the insulation package to be fastened by means of a rubber band to the frame element or the connection element.

In a preferred form of construction of the aircraft component assembly system according to the invention, the frame element comprises at least one pivot mechanism that enables a first portion of the frame element to pivot relative to a second portion of the frame element. The swivel mechanism may for example take the form of a hinge. This allows a particularly space-saving transportation of frame element. If desired or necessary, the frame element may also comprise a plurality of pivot mechanisms.

A method according to the invention of assembling an interior component, a pipe and/or an electric line in an aircraft comprises the steps: providing an aircraft component assembly system as described above, fastening the interior component, the pipe and/or the electric line to the aircraft component assembly system, connecting the first guide device provided on the fame element and/or the connection element of the aircraft component assembly system to the second guide device that is complementary to the first guide device and provided on the aircraft structure, and displacing the aircraft component assembly system relative to the aircraft structure until the aircraft component assembly system is situated in a desired position relative to the aircraft structure. The interior component, the pipe and/or the electric line is/are preferably fastened to the aircraft component assembly system before the aircraft component assembly system is connected displaceably to the aircraft structure.

Once the aircraft component assembly system has reached the desired position relative to the aircraft structure, the aircraft component assembly system is preferably fixed in the desired position on the aircraft structure by means of the fixing device taking for example the form of a detent mechanism.

Once the aircraft component assembly system is situated in the desired position relative to the aircraft structure, the first interface provided on the aircraft component assembly system is preferably electrically connected to the second interface that is complementary to the first interface. If a plurality of first interfaces are provided on the aircraft component assembly system, preferably all of the first interfaces are electrically connected to corresponding second interfaces that are for example fitted on the aircraft structure or a separate component or integrated into the aircraft structure or a separate component.

In a similar manner the first connector of the pipe fastened to the aircraft component assembly system and/or integrated into the aircraft component assembly system are preferably connected to the second connector that is complementary to the first connector when the aircraft component assembly system is situated in the desired position relative to the aircraft structure, If a plurality of pipes having corresponding first connectors are fastened to the aircraft component assembly system and/or integrated into the aircraft component assembly system, all of the first connectors are connected to corresponding complementary second connectors when the aircraft component assembly system is situated in the desired position relative to the aircraft structure.

According to a preferred form of implementation of the method according to the invention of assembling an aircraft component assembly system in an aircraft, prior to connecting the first guide device provided on the frame element and/or the connection element of the aircraft component assembly system to the second guide device that is complementary to the first guide device and provided on the aircraft structure an insulation package is fastened to the frame element and/or the connection element of the aircraft component assembly system. If need be, a plurality of insulation packages may also be fastened to the frame element and/or the connection element of the aircraft component assembly system. This enables a particularly easy and convenient installation of the secondary insulation of the aircraft.

BRIEF DESCRIPTION OF THE DRAWINGS

There now follows a detailed description of a preferred embodiment of the invention with reference to the accompanying diagrammatic drawings, which show.

DETAILED DESCRIPTION

Figure 1:
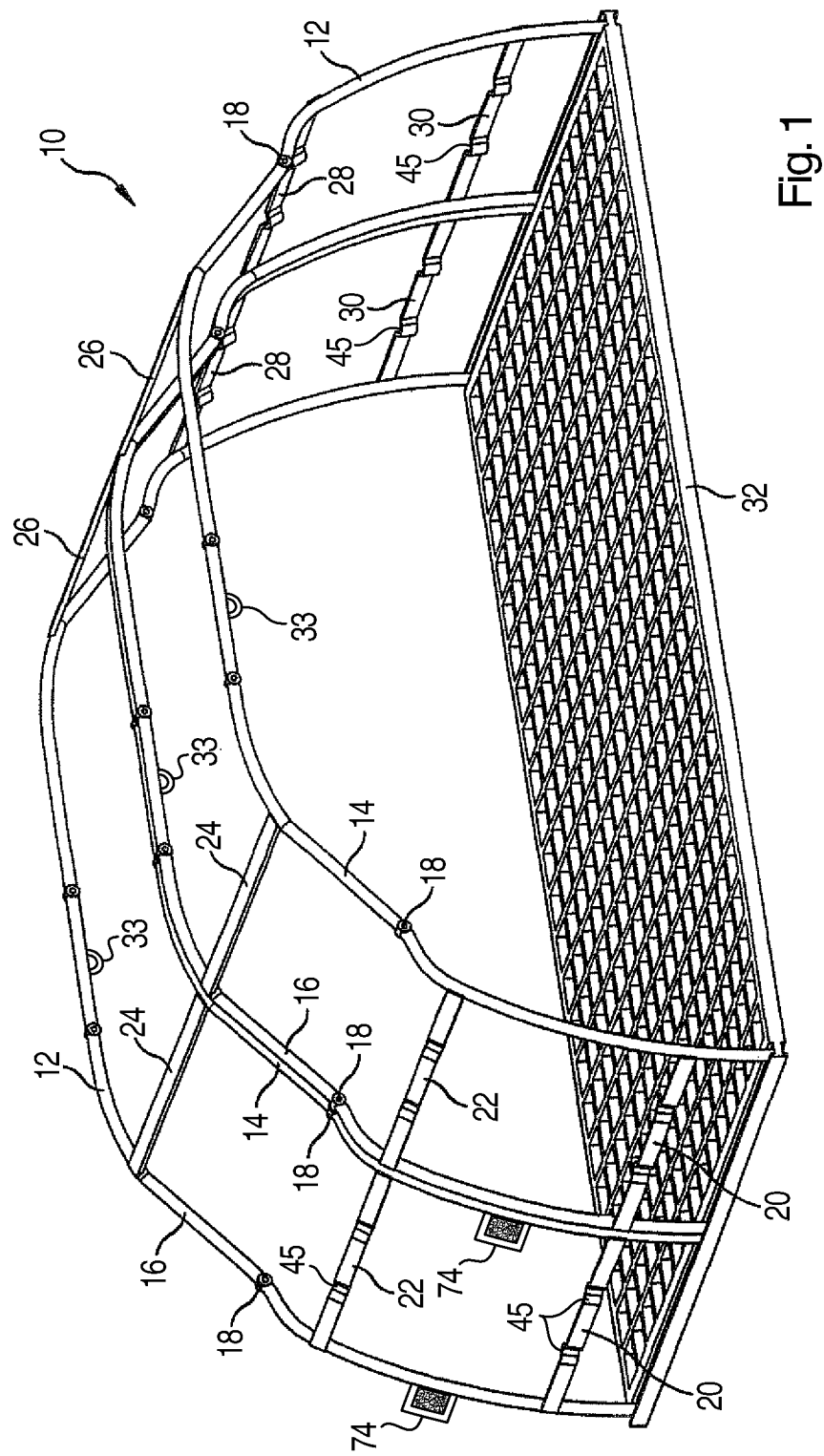
FIG. 1 a first embodiment of an aircraft component assembly system according to the invention, FIG. 2 the aircraft component assembly system according to FIG. 1 with interior components fastened thereto, FIG. 3 the aircraft component assembly system according to FIG. 2 in the state of connection to an aircraft structure, FIG. 4 an enlarged representation of a first and a second guide device for the displaceable connection of the aircraft component assembly system according to FIG. 3 to the aircraft structure, FIG. 5 a second embodiment of an aircraft component assembly system according to the invention with interior components fastened thereto, FIG. 6 an enlarged cutout of the aircraft component assembly system according to FIG. 5 in the state of connection to an aircraft structure.

FIG. 1 shows a first embodiment of an aircraft component assembly system 10 for assembling interior components, pipes and electric lines in an aircraft. The aircraft component assembly system 10 comprises two arc-shaped frame elements 12 made of aluminium, each comprising two longitudinal struts 14, 16 extending parallel to one another. On the longitudinal struts 14, 16 of the frame elements 12 a plurality of shackle-shaped force introduction apparatuses 18 are formed. Connecting struts 20, 22, 24, 26, 28, 30 extend substantially parallel to one another between the longitudinal struts 14, 16 of the frame elements 12, wherein the connecting struts 20, 22, 28, 30 each are provided with two recesses.

A connection element 32 made likewise of aluminium extends between a first and a second end of the frame elements 12 and forms a kind of sub-floor, which is spanned in an arc-shaped manner by the frame elements 12. The connection element 32 lends an adequate rigidity to the aircraft component assembly system 10, so that the aircraft component assembly system 10 forms a self-supporting assembly group that may be handled independently.

Formed on the frame elements 12 are fastening apparatuses 33, of which only a few are schematically shown in the drawings, that are used to fasten interior components, pipes and electric lines to the frame elements 12. As is evident from FIGS. 2 and 3, side trim panels 34, ceiling trim panels 36 and luggage compartments 38 may be fastened to the frame elements 12 of the aircraft component assembly system 10. As fastening apparatuses 33 for fastening these components to the frame elements 12 of the aircraft component assembly system 10, mountings, clamps or detent apparatuses may be used. It is however alternatively possible to provide screw-fastening apparatuses.

Besides the illustrated components it is of course also possible to fasten other interior components, such as for example door frame components, rows of luminaires etc., to the frame elements 12 of the aircraft component assembly system 10. Pipes of an aircraft air-conditioning system or of a water supply system as well as electric lines may be fixed for example along the struts 14, 16, 20, 22, 24, 26, 28, 30 to the frame elements 12. As an alternative or in addition thereto, the longitudinal struts 14, 16 and/or the connecting struts 20, 22, 24, 26, 28, 30 of the frame elements 12 may be of a hollow-cylindrical construction and hence may be used as pipes integrated into the frame elements 12 or as conduits for electric lines.

Figure 2:
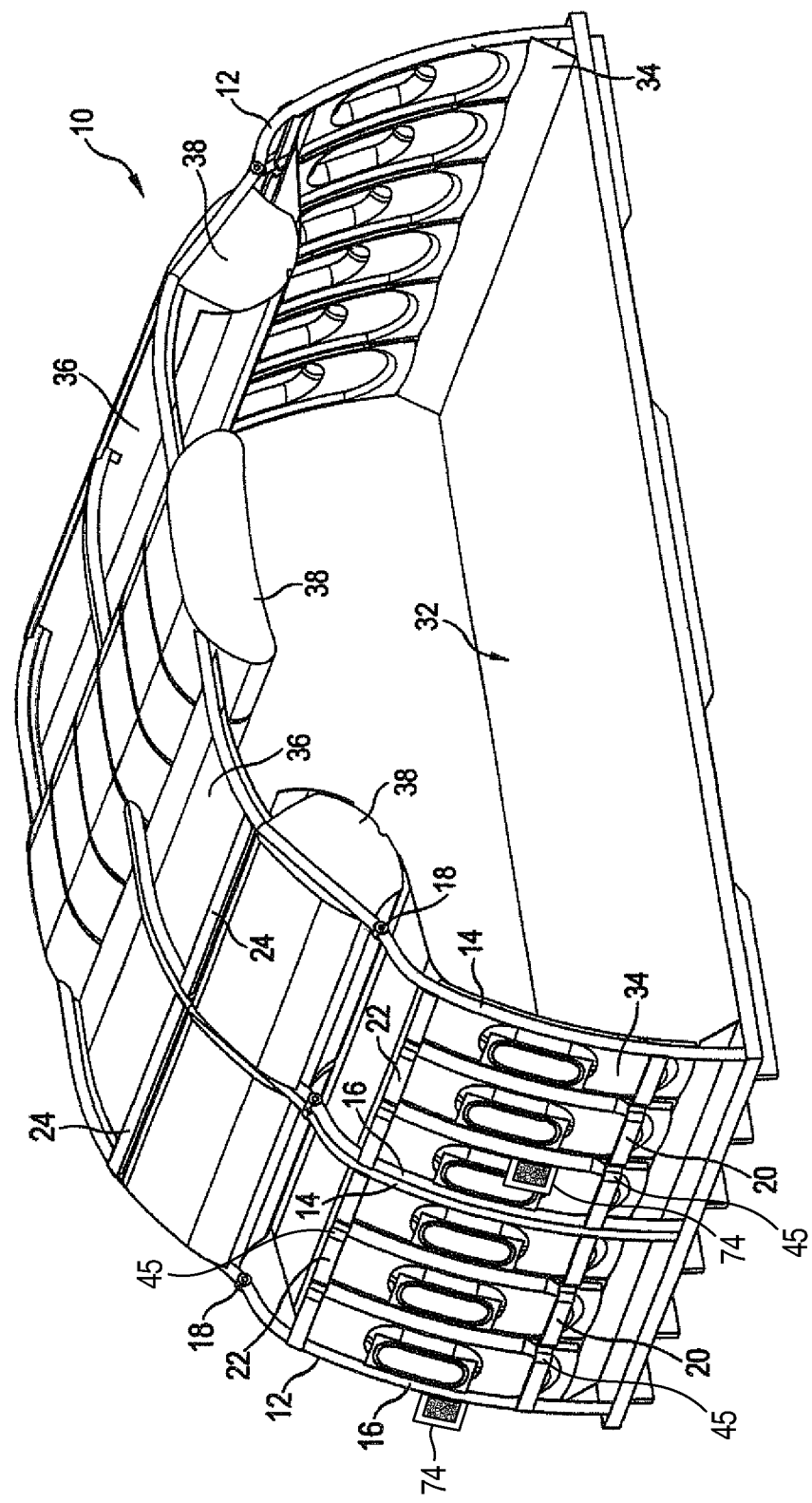
Figure 3:
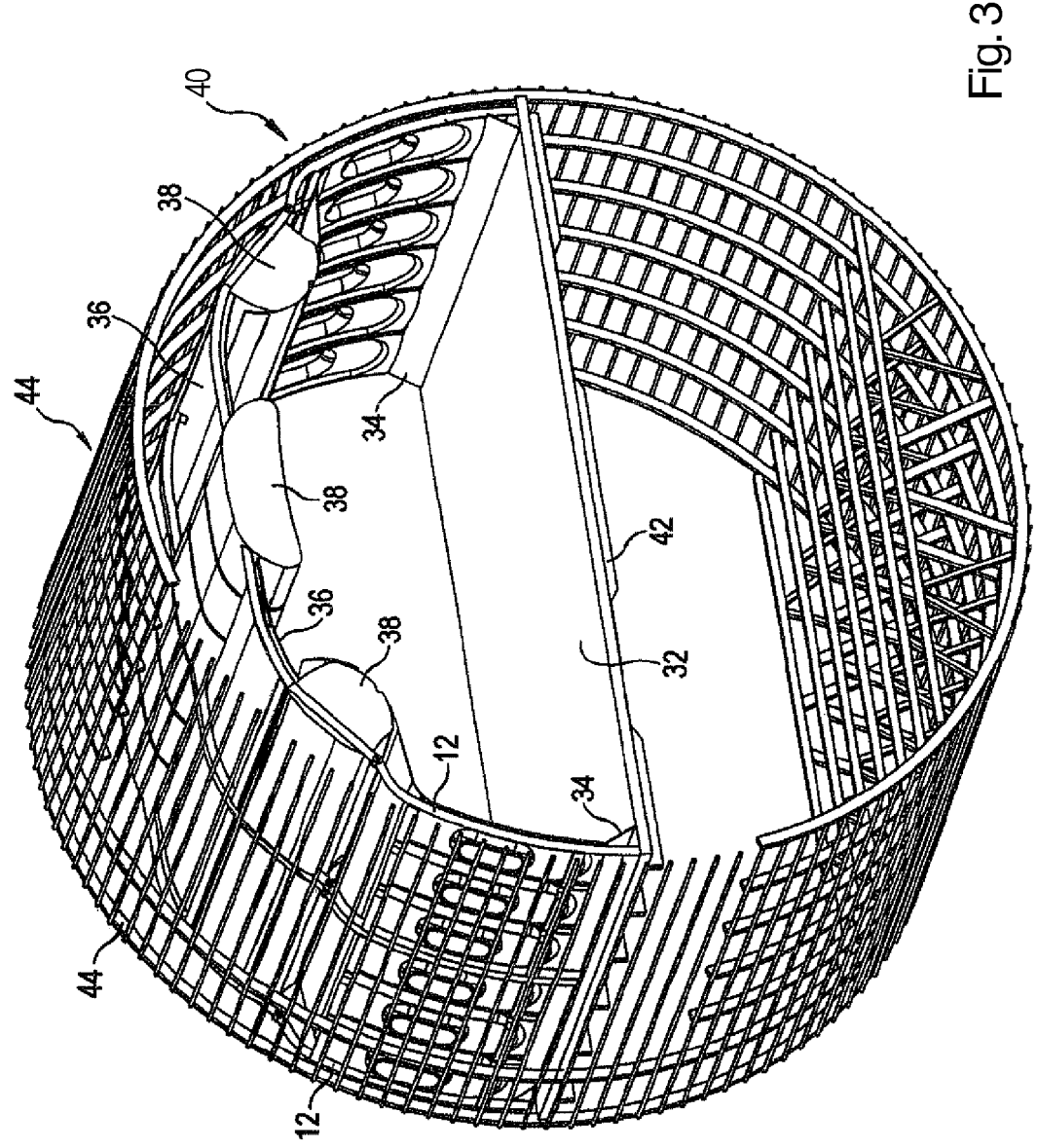

The connection element 32, which in FIGS. 2 and 3 comprises a continuous covering forming a walk-on floor, is likewise provided with fastening apparatuses 33 for fastening further interior components, which are not shown in the figures, to the connection element 32. In particular, there are formed in the connection element 32 rails that are used to fasten a plurality of rows of seats to the connection element 32. It is however moreover possible for pipes and electric lines also to be fastened to the connection element 32 or integrated into the connection element 32.

On the frame elements 12, further fastening apparatuses 74 are moreover formed, which are used to fasten insulation packages (likewise not shown in the figures) forming parts of a secondary insulation of the aircraft to the frame elements 12. The insulation packages may be fastened to the frame elements 12 between the interior components and the frame elements 12. It is however alternatively possible to fasten the insulation packages to the frame elements 12 at a side of the frame elements 12 remote from the interior components.

FIG. 3 shows the aircraft component assembly system 10 with the interior components fastened thereto in the state of connection to part of an aircraft structure 40. In the state of connection of the aircraft component assembly system 10 to the aircraft structure 40, the connection element 32 is supported on crossmembers 42 of the aircraft structure 40 that are disposed parallel to one another. The longitudinal struts 14, 16 extend at least in sections substantially parallel to ribs 44 of the aircraft structure 40. By means of the force introduction apparatuses 18 formed on the longitudinal struts 14, 16 of the frame elements 12 the frame elements 12 may be screw-fastened to the ribs 44 of the aircraft structure 40 with the aid of bolts passed through the force introduction apparatuses 18. In the state of connection of the aircraft component assembly system 10 to the aircraft structure 40, the ribs 44 are accommodated in the recesses 45 provided on the connecting struts 20, 22, 28, 30 of the frame elements 12. It is thereby guaranteed that the ribs 44 do not impede the fastening of the frame elements 12 to the aircraft structure 40.

For the acoustic decoupling of the frame elements 12 from the aircraft structure 40, the fastening of the frame elements 12 to the ribs 44 of the aircraft structure 40 is effected via shock mounts, i.e. bearing arrangements made of a vibration-damping material, which are not shown in the figures. The shock mounts ensure a shock-free fastening of the frame elements 12 to the aircraft structure 40 and each are provided with a through-opening, through which the bolts used to fasten the frame elements 12 to the ribs 44 of the aircraft structure 40 may be passed.

Figure 4:
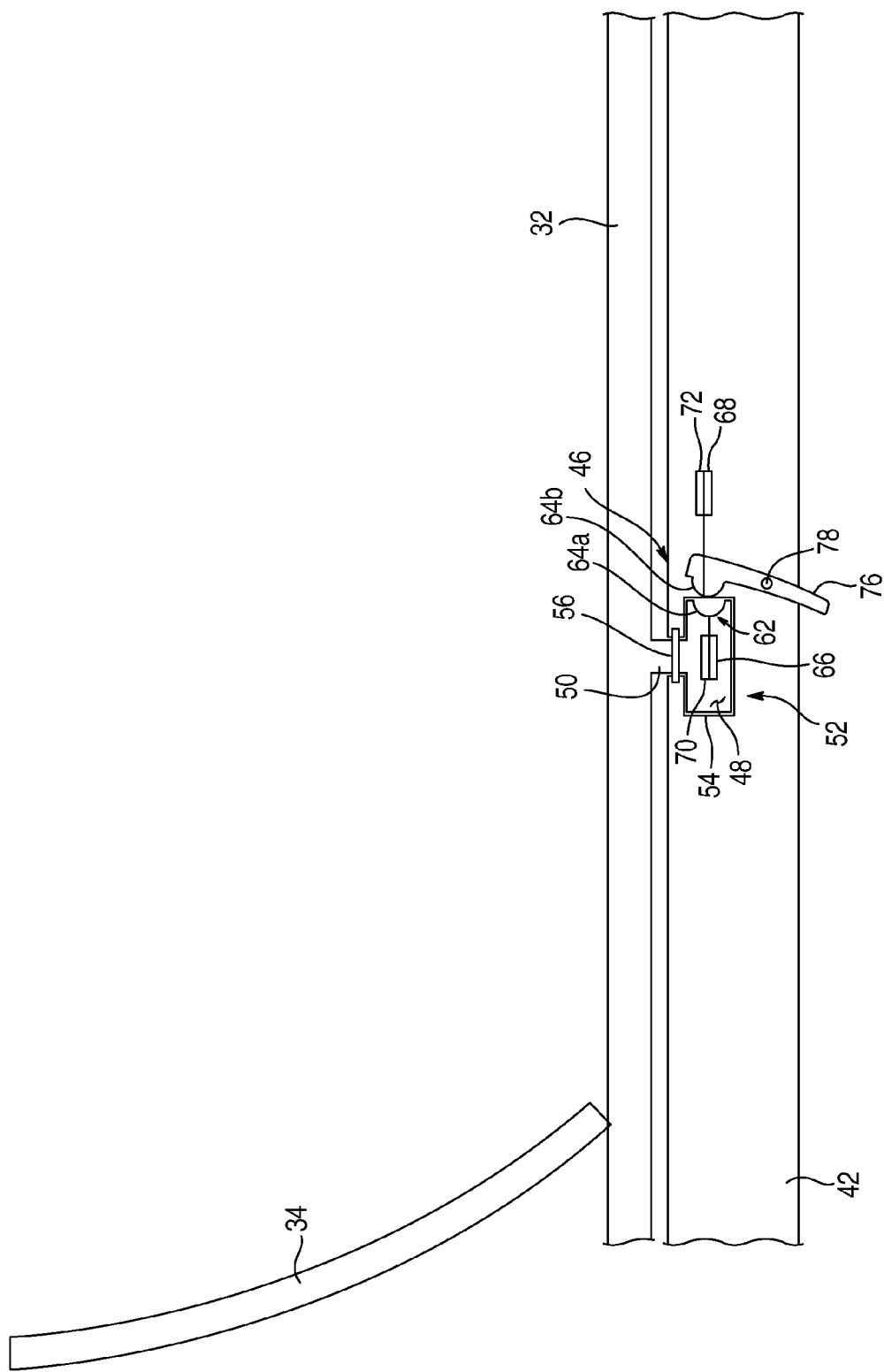

As is evident in particular from FIG. 4, a first guide device 46 extends from a surface of the connection element 32 that in the assembled state of the aircraft component assembly system 10 faces the crossmembers 42 of the aircraft structure 40. The first guide device 46 comprises a guide rail 48, which is fitted by means of a connecting web 50 on the connection element 32. The first guide device 46 is devised to interact with a second guide device 52 that is formed in the crossmembers 42 of the aircraft structure 40. In particular, the second guide device 52 comprises a receiver 54, which is used to receive the guide rail 48 of the first guide device 46 in a displaceable manner. By virtue of the interaction of the first guide device 46 with the second guide device 52, the connection element 32 and hence the entire aircraft component assembly system 10 is connectable to the aircraft structure 40 so as to be displaceable relative to the aircraft structure 40.

Disposed in the region of the connecting web 50 of the first guide device 46 is a shock mount 56 made of a vibration-damping material, such as for example a rubber-elastic material. The shock mount 56 ensures a shock-free mounting of the connection element 32 and hence of the entire aircraft component assembly system 10 on the crossmembers 42 of the aircraft structure 40. This enables an acoustic decoupling of the aircraft component assembly system 10 and of the components fastened thereto from the aircraft structure 40.

A fixing device 62, which may for example take the form of a detent mechanism 64*a*, 64*b*, ensures that the aircraft component assembly system is interlocked in a desired position with the aircraft structure 40 when the aircraft component assembly system 10 is situated in the desired position relative to the aircraft structure.

There is moreover provided on the aircraft component assembly system 10 a first interface 66, which may be connected to electric lines fastened to the aircraft component assembly system 10. The first interface 66 is provided for electrical connection to a second interface 68, which is complementary to the first interface 66 and fastened to the aircraft structure 40, when the aircraft component assembly system 10 has reached the desired position relative to the aircraft structure 40.

In a similar manner, first connectors 70 of pipes, which are fastened to the aircraft component assembly system 10 and/or integrated into the aircraft component assembly system 10, are connectable to second connectors 72, which are complementary to the first connectors 70 and fastened to the aircraft structure 40, when the aircraft component assembly system 10 is situated in the desired position relative to the aircraft structure 40.

For assembly of the aircraft component assembly system 10 in an aircraft, first the desired interior components, pipes and electric lines are fastened to the frame elements 12 and the connection element 32 of the aircraft component assembly system 10. If desired, insulation packages forming part of the secondary insulation of the aircraft may moreover also be fastened to the frame elements 12 of the aircraft component assembly system 10. For example, the fastening of insulation packages may be performed using the further fastening devices 74, which may take the form of a Velcro fastener, a burr and fleece strip, a mushroom button strip or a Christmas tree fastening device. The components fastened to the aircraft component assembly system 10 may be functionally tested while still outside of the aircraft.

The first guide device 46 formed on the connection element 32 of the aircraft component assembly system 10 is then brought into engagement with the second guide device 52 provided on the crossmembers 42 of the aircraft structure 40. By virtue of the interaction of the first guide device 46 with the second guide device 52 the aircraft component assembly system 10 with the components fastened thereto may then be displaced relative to the aircraft structure 40 until the aircraft component assembly system 10 with the components fastened thereto has reached a Once the aircraft component assembly system 10 with the components fastened thereto is situated in the desired position relative to the aircraft structure 40, the aircraft component assembly system 10 is fixed to the aircraft structure 40 with the aid of the fixing device 62 for example in the form of a detent mechanism 64*a*, 64*b*. At the same time, the first interface 66 provided on the aircraft component assembly system 10 is electrically connected to the second interface 68, which is complementary to the first interface 66 and fitted on the aircraft structure 40. An electrical connection is therefore established between the electric lines fastened to the aircraft component assembly system 10 and corresponding aircraft-structure-side service lines. In a similar manner, the first connectors 70 of the pipes, which are fastened to the aircraft component assembly system 10 and/or integrated into the aircraft component assembly system 10, are connected to complementary aircraft-structure-side second connectors 72. For example, the fixing device 62 may comprise a lever 76, which is connectable by a pivot joint 78 to a crossmember 42 of the aircraft structure 40. At one end of the lever 76, a detent apparatus 64*b* may be situated, which is devised to interact with a complementary detent apparatus 64*a* that is provided for example on the connection element of the aircraft component assembly system 10. The first interface 66 and the first connector 70 for pipes may be integrated into the detent apparatus 64*a*, while the second interface 68 and the second connector 72 for pipes may be integrated into the detent apparatus 64*b* provided on the lever 76, as schematically shown in FIG. 4.

Figure 5:
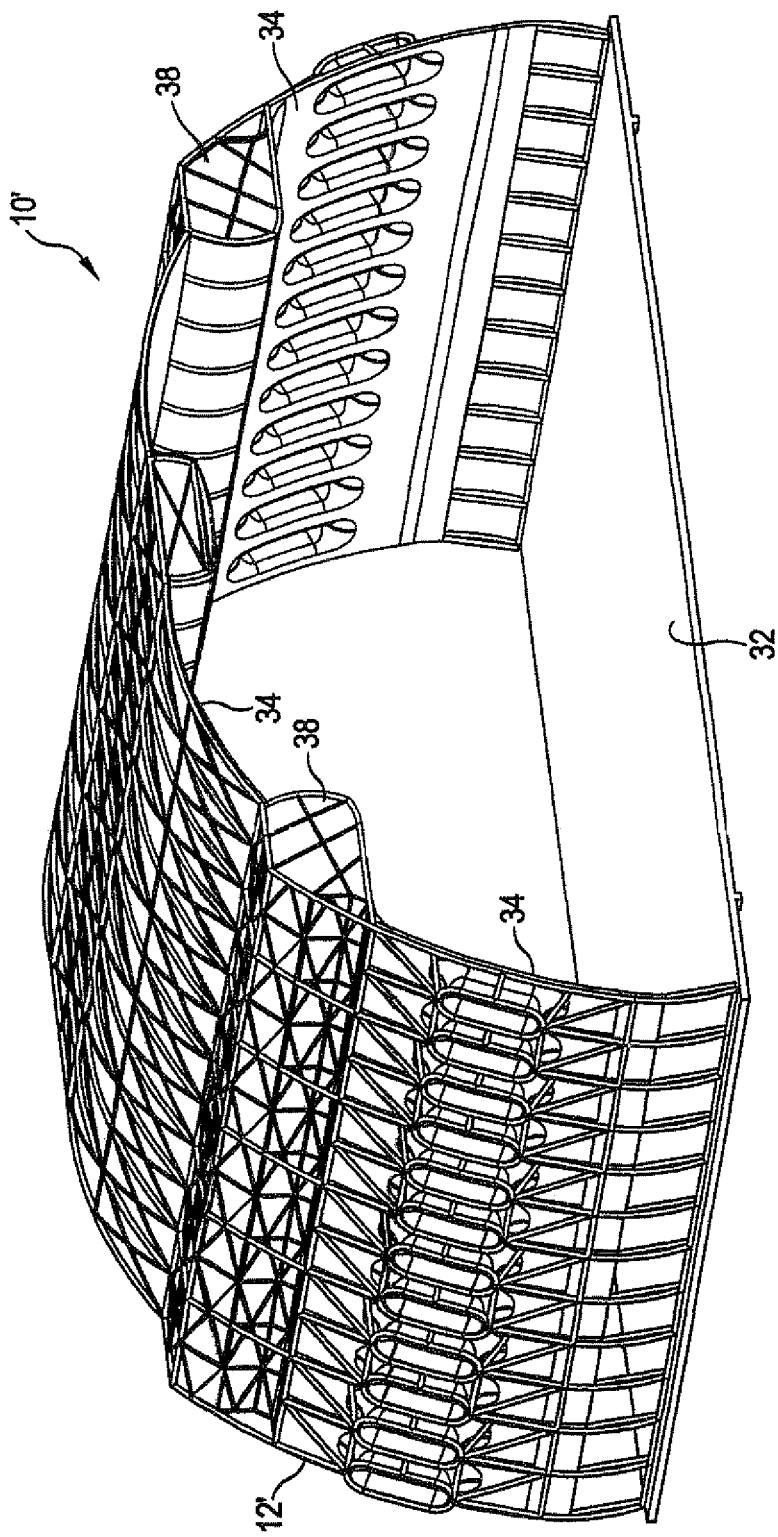
Figure 6:
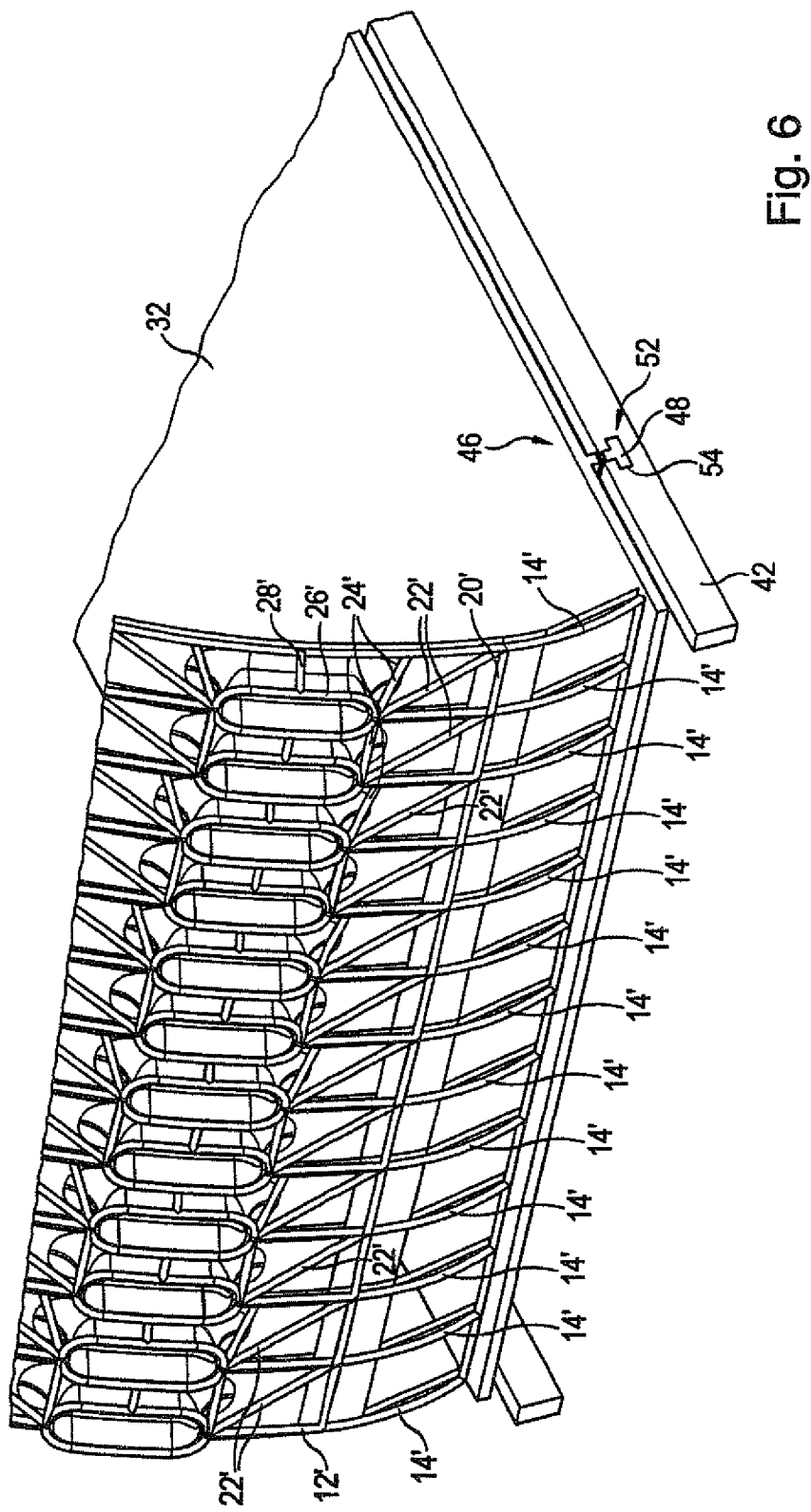

FIGS. 5 and 6 show a second embodiment of an aircraft component assembly system 10'. Unlike the aircraft component assembly system 10 illustrated in FIGS. 1 to 4, the aircraft component assembly system 10' according to FIGS. 5 and 6 comprises only a single frame element 12', which comprises a plurality of longitudinal struts 14' extending substantially parallel to one another. Connecting struts 20', 22', 24', 26' and 28' no longer extend merely at right angles to the longitudinal struts 14' but are disposed at an angle to the longitudinal struts 14'. Otherwise the construction of the aircraft component assembly system 10' according to FIGS. 5 and 6 corresponds to that of the aircraft component assembly system 10 illustrated in FIGS. 1 to 4.

Figure 7:
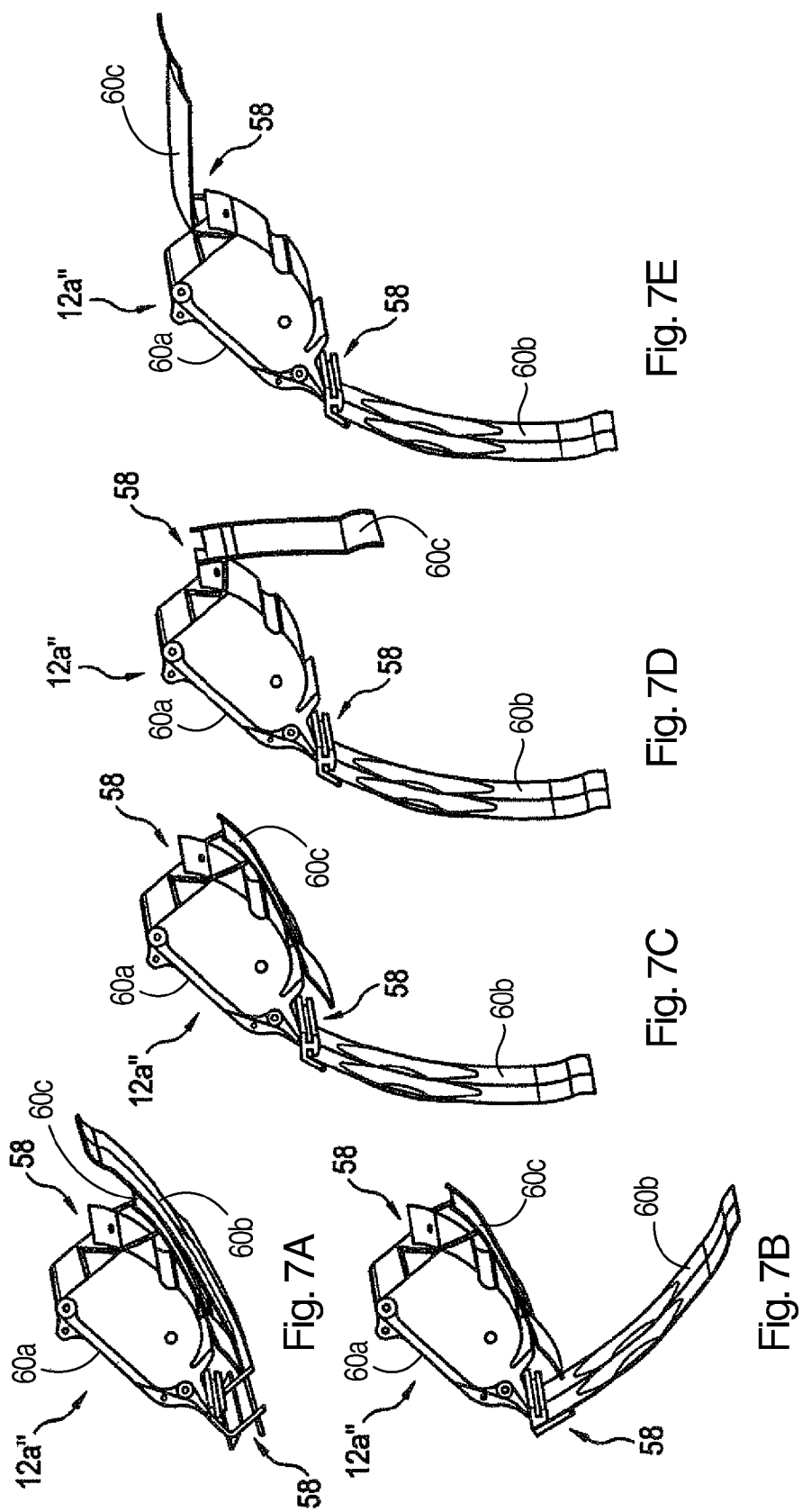
FIG. 7A is a side view of part of a frame element of a third embodiment of an aircraft component assembly system according to the invention with interior components fastened thereto, the part of the frame element including two movable portions in a first stowed position.
FIG. 7B is a side view of the part of the frame element of FIG. 7A, with one of the two moveable portions moved toward a second deployed position.
FIG. 7C is a side view of the part of the frame element of FIG. 7B, with one of the two moveable portions moved into a second deployed position.
FIG. 7D is a side view of the part of the frame element of FIG. 7C, with the other of the two moveable portions moved toward a second deployed position.
FIG. 7E is a side view of the part of the frame element of FIG. 7D, with the other of the two moveable portions moved into a second deployed position, and FIG. 8 the third embodiment of an aircraft component assembly system according to the invention in the state of connection to an aircraft structure.
Figure 8:
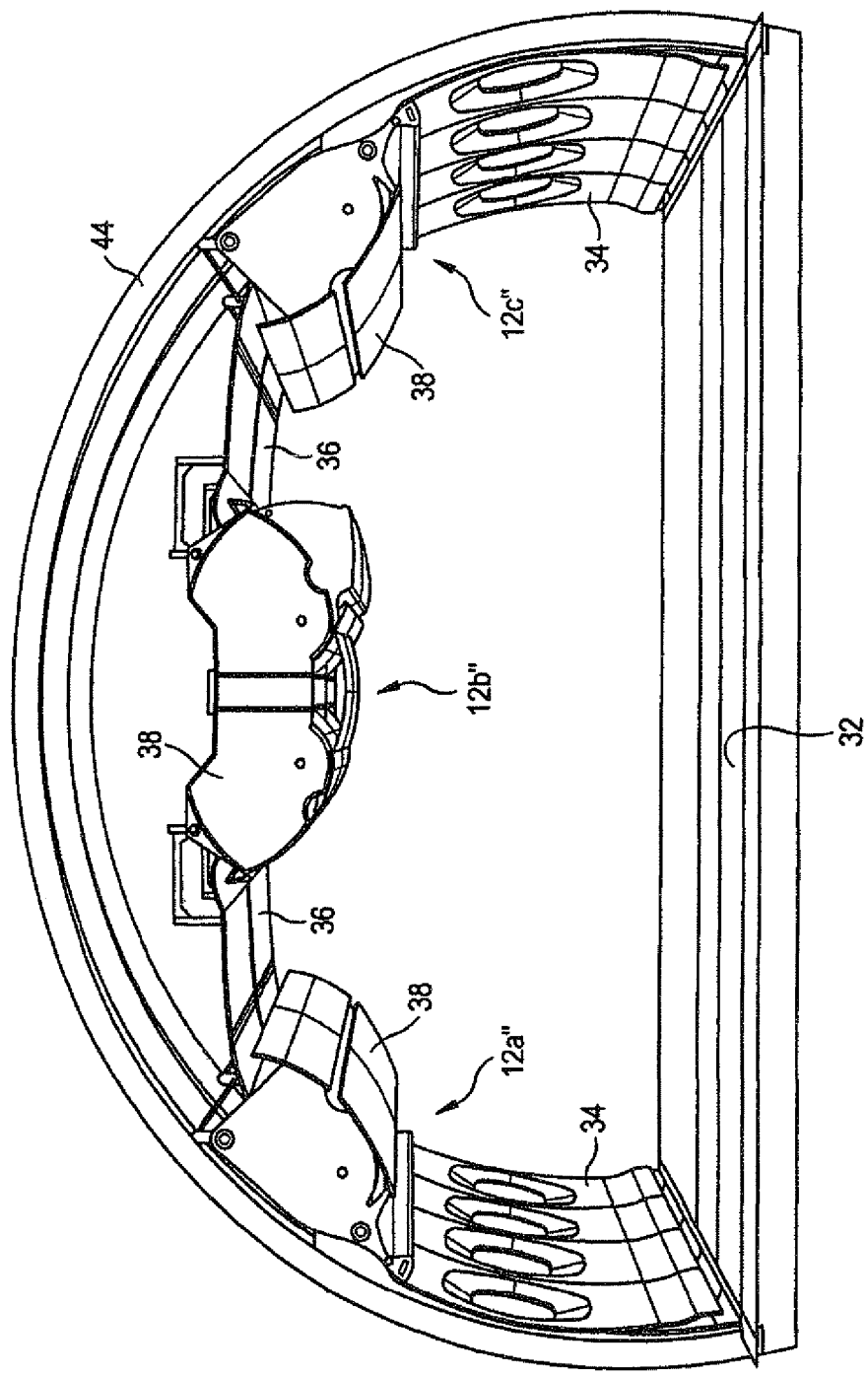

FIGS. 7A-7E show a part 12a" of a frame element 12" of a third embodiment of an aircraft component assembly system 10", which is represented in the state of connection to an aircraft structure in FIG. 8. The part 12a" of the frame element 12" illustrated in FIGS. 7A-7E is equipped with a pivot mechanism 58 equipped in the form of hinges. By means of the pivot mechanisms 58, portions 60a, 60b, 60c of the frame element part 12a" may be pivoted relative to one another. This allows a space-saving transportation of the frame element part 12a". More specifically, FIG. 7A shows two of the movable portions 60b, 60c in a first stowed position relative to the portion 60a; FIG. 7B shows one of the moveable portions 60b moved toward a second deployed position; FIG. 7C shows one of the two moveable portions 60b moved into a second deployed position, FIG. 7D shows the other of the two moveable portions 60c moved toward a second deployed position, and FIG. 7E shows the other of the two moveable portions 60c moved into a second deployed position.

As is evident from FIG. 8, the frame element 12" comprises three parts 12a", 12b", 12c", which in the interconnected state form the frame element 12". Each part 12a", 12b", 12c" is equipped with corresponding pivot mechanisms 58 that allow individual portions of the frame element parts 12a", 12b", 12c" to pivot relative to one another.

The invention claimed is:

1. An aircraft component assembly system for use in the assembly of at least one of an interior component, a pipe and an electric line in an aircraft, the aircraft including aircraft structure having a fuselage extending in a longitudinal direction, the aircraft component assembly system comprising:
   at least one arc-shaped frame element, which comprises a plurality of spaced apart struts that are disposed at least in sections substantially parallel to one another and within a vertical plane transverse to the longitudinal direction, the plurality of struts spanning both side walls and a ceiling of an aircraft cabin structure in a fully assembled state,
   a connection element that extends between a first and a second end of the frame element and is devised, in the assembled state of the aircraft component assembly system in an aircraft, to form an element of a floor of a cabin of the aircraft,
   a fastening apparatus for fastening at least one of the interior component, the pipe and the electric line to the frame element or to the connection element, and
   a first guide device that is provided on the frame element or the connection element and is devised to interact with a second guide device, which is complementary to the first guide device and provided on an aircraft structure, in such a way that the aircraft component assembly system is connectable to the aircraft structure in a manner slideable within the fuselage in the longitudinal direction.

2. The aircraft component assembly system according to claim 1, further comprising:
   a fixing device that is devised to fix the aircraft component assembly system in a desired position on the aircraft structure.

3. The aircraft component assembly system according to claim 2, wherein the fixing device takes the form of a detent mechanism that is devised to interlock the aircraft component assembly system with the aircraft structure when the aircraft component assembly system is situated in the desired position relative to the aircraft structure.

4. The aircraft component assembly system according to claim 3, wherein the detent mechanism includes first and second detent apparatuses, the first detent apparatus being located on the aircraft component assembly system and being integrated with each of a first interface connected to at least one electric line fastened to the aircraft component assembly system and a first connector for pipes fastened to the aircraft component assembly system, the second detent apparatus being located on the aircraft structure and integrated with a second interface and a second connector for pipes, the first and second interfaces and the first and second connectors being automatically coupled with the first and second detent apparatuses.

5. The aircraft component assembly system according to claim 1, wherein on the frame element at least one force introduction apparatus is formed for fitting the frame element on a rib of the aircraft structure, and wherein the first guide device comprises a guide rail, which extends from the connection element and is devised to interact with a receiver of the second guide device that is provided in cross-members of the aircraft structure.

6. The aircraft component assembly system according to claim 1, wherein at least one of the first and the second guide device comprises a device for the acoustic decoupling of the aircraft component assembly system from the aircraft structure.

7. The aircraft component assembly system according to claim 1, wherein on the aircraft component assembly system at least one first interface is provided, which is connected to at least one electric line fastened to the aircraft component assembly system and is electrically connectable to a second interface, which is complementary to the first interface, when the aircraft component assembly system is situated in the desired position relative to the aircraft structure.

8. The aircraft component assembly system according to claim 1, wherein a first connector of a pipe, which is fastened to the aircraft component assembly system or integrated into the aircraft component assembly system, is connectable to a second connector, which is complementary to the first connector, when the aircraft component assembly system is situated in the desired position relative to the aircraft structure.

9. The aircraft component assembly system according to claim 1, wherein at least one strut of the frame element is of a hollow-cylindrical construction.

10. The aircraft component assembly system according to claim 1, further comprising:
    a further fastening apparatus for fastening an insulation package to at least one of the frame element and the connection element.

11. A method of assembling at least one of an interior component, a pipe and an electric line in an aircraft, comprising:
    providing an aircraft component assembly system according to claim 1,
    fastening the at least one of the interior component, the pipe and the electric line to at least one of the frame element or the connection element of the aircraft component assembly system,
    connecting the first guide device provided on the at least one of the frame element or the connection element to the second guide device, which is complementary to the first guide device and provided on the aircraft structure, and
    displacing the aircraft component assembly system relative to the aircraft structure while the first and second guide devices are connected until the aircraft component assembly system is situated in a desired position relative to the aircraft structure.

12. The method according to claim 11, further comprising:
fixing the aircraft component assembly system in the desired position on the aircraft structure with a fixing device.

13. The method according to claim 12, wherein fixing the aircraft component assembly system in the desired position further comprises:
connecting a first detent apparatus on the aircraft component assembly system with a second detent apparatus on the aircraft structure;
electrically connecting a first interface provided on the aircraft component assembly system and integrated into the first detent apparatus to a second interface integrated with the second detent apparatus as the first and second detent apparatuses are connected; and
connecting a first connector of pipes, which is fastened to the aircraft component assembly system and integrated into the first detent apparatus to a second connector integrated with the second detent apparatus as the first and second detent apparatuses are connected.

14. The method according to claim 11, further comprising:
electrically connecting a first interface provided on the aircraft component assembly system to a second interface, which is complementary to the first interface, when the aircraft component assembly system is situated in the desired position relative to the aircraft structure.

15. The method according to claim 11, further comprising:
connecting a first connector of the pipe, which is fastened to the aircraft component assembly system or integrated into the aircraft component assembly system, to a second connector, which is complementary to the first connector, when the aircraft component assembly system is situated in the desired position relative to the aircraft structure.

16. The method according to claim 11, further comprising:
prior to connecting of the first guide device to the second guide device, fastening an insulation package to at least one of the frame element and the connection element of the aircraft component assembly system.

\* \* \* \* \*